though the use of 3-pentenyllithium for this purpose is not taught therein, nor is 3-pentenyllithium mentioned with specificity in any other prior art reference of which we are aware, we believe this compound to represent a novel composition of matter.

United States Patent [19]
Kamienski et al.

[11] 3,742,077
[45] June 26, 1973

[54] METHOD OF PREPARING TELOMERS UTILIZING AS CATALYSTS HYDROCARBON-SOLUBLE ORGANOMETALLIC COMPLEXES OF METALS OF GROUPS I AND IIA OF THE PERIODIC TABLE

[75] Inventors: Conrad W. Kamienski, Gastonia, N.C.; Jerome F. Eastham, Knoxville, Tenn.

[73] Assignee: Lithium Corporation of America, New York, N.Y.

[22] Filed: July 23, 1970

[21] Appl. No.: 57,820

Related U.S. Application Data
[63] Continuation-in-part of Ser. No. 728,838, May 13, 1968.

[52] U.S. Cl. 260/668 B, 260/671 C, 260/683.15 D, 260/683.15 E
[51] Int. Cl. ............................................. C07c 15/00
[58] Field of Search ............... 260/668 B, 683.15 D, 260/683.15 E, 671 C

[56]  References Cited
UNITED STATES PATENTS

| | | | |
|---|---|---|---|
| 3,097,246 | 7/1963 | Favis | 260/671 C |
| 3,206,519 | 9/1965 | Eberhardt | 260/668 B X |
| 3,223,742 | 12/1965 | Eberhardt | 260/668 B |
| 3,404,194 | 10/1968 | Crain et al. | 260/683.15 D |
| 2,728,802 | 12/1955 | Closson et al. | 260/671 C |
| 2,927,086 | 3/1960 | Gordon et al. | 260/671 C |
| 3,031,514 | 4/1962 | Kosmin | 260/671 C |

*Primary Examiner*—Helen M. S. Sneed
*Attorney*—Wallenstein, Spangenberg, Hattis & Strampel

[57] ABSTRACT

Method of preparing telomers, such as those derived from toluene as the telogen and 1,3-butadiene as the taxogen, which comprises carrying out the telomerization reaction in the presence of a hydrocarbon-soluble organometallic complex of metals of Groups I and IIa of the periodic system, exemplified by complexes of di-n-butylmagnesium with n-butyllithium of n-butyl-potassium.

12 Claims, No Drawings

METHOD OF PREPARING TELOMERS UTILIZING AS CATALYSTS HYDROCARBON-SOLUBLE ORGANOMETALLIC COMPLEXES OF METALS OF GROUPS I AND IIA OF THE PERIODIC TABLE

This application is a continuation-in-part of application Serial No. 728,838, filed May 13, 1968.

This invention relates to telomerization reactions in the presence of hydrocarbon-soluble organometallic complexes of metals of Groups I and IIa of the Periodic System as anionic catalysts.

In our copending application, Ser. No. 728,838, filed May 13, 1968, now abandoned, we have disclosed various complexes of diorganomagnesiums with various organometallic compounds of metals of Group I of the Periodic System, illustrative of such complexes being di-n-butylmagnesium complexed with alkyllithiums such as sec-butyllithium and n-butyllithium. Primary, linear dialkylmagnesium compounds are normally insoluble in liquid hydrocarbon solvents, whereas secondary and tertiary as well as certain primary nonlinear dialkylmagnesium compounds are generally quite soluble in liquid hydrocarbon solvents. In our said copending application, we have disclosed that alkyllithiums, which may be represented by the formula RLi where R is alkyl, when complexed with hydrocarbon-insoluble diorganomagnesiums, which may be represented by the formula RR'Mg where R and R' are the same or different organo radicals, produce complexes which are soluble in various liquid hydrocarbon solvents. The complexes are disclosed in our said copending application as useful for a number of purposes, among which are as catalysts in certain types of telomerization reactions.

In the procedures described in our aforementioned copending application, referring, by way of illustration, to the preparation of a complex of di-n-butylmagnesium with sec-butyllithium and n-butyllithium, the di-n-butylmagnesium is initially produced by a procedure involving utilizing an "activated" powdered, anhydrous $MgCl_2$ and wherein powdered anhydrous $MgCl_2$ is mixed with anhydrous benzene, anhydrous ethyl ether is added, followed by the addition of n-butyllithium in benzene. After cooling, allowing the mixture to come to room temperature, stirring for 14 to 16 hours, separating the supernatant, adding additional n-butyllithium in benzene and distilling and heating, a slurry is recovered containing the di-n-butylmagnesium. The slurry is then mixed with sec-butyllithium in cyclohexane and n-butyllithium in a mixture of hexane and cyclohexane and, afer mixing well, the mixture is subjected to centrifugation. A solution of a complex results of di-n-butylmagnesium with sec-butyllithium and n-butyllithium.

In the telomerizations carried out in accordance with our present invention, the hydrocarbon-soluble complexes used as anionic catalysts are prepared by relatively simple methods. Thus, for instance, in the case of the diorganomagnesium complexes, their methods of production generally fall into two categories.

In the first method, illustrated by the production of a complex of a hydrocarbon-insoluble primary, linear dialkylmagnesium with an alkyllithium, a hydrocarbon-soluble mixed dialkylmagnesium complex is formed. The primary, linear dialkylmagnesium compound is prepared directly in the hydrocarbon solvent from magnesium metal and the corresponding alkyl halide by known methods. Then, an amount of a secondary or tertiary alkyllithium equivalent to form 5 to 100 percent of the primary, linear dialkylmagnesium compound formed in the first step is added to react with the by-product $MgCl_2$ formed in the direct preparation step. The resulting liquid solution is separated from the solids and said liquid solution containing a complex of a primary dialkylmagnesium with a secondary or tertiary dialkylmagnesium is then complexed with n-butyllithium or other Group I metal organic compounds.

In the second method, any desired alkyllithium is added in sufficient quantity to both react with all of the by-product $MgCl_2$ and also to form a complex with the so-prepared dialkyl magnesium compound, for example:

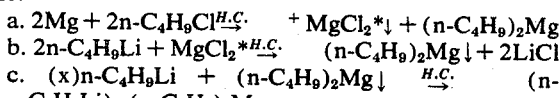

* Activated form
+ Hydrocarbon solvent

This treatment results in the formation of a hydrocarbon-soluble organolithium-diorganomagnesium complex. The term "x" in equation (c) above can vary from 0.5 to 10 or even higher if desired, but generally will not be greater than 5. Preferred mole ratios of organolithium to diorganomagnesium are from 0.5 to 2 moles of the organolithium to one mole of the diorganomagnesium.

The hydrocarbon-soluble diorganomagnesium complexes derived from the practice of the first method can be utilized as solubilizing agents for other hydrocarbon-insoluble organometallics of Group I metals such as n-butylsodium and n-butylpotassium in hydrocarbon media. For example, admixture of one molar equivalent of a hydrocarbon-soluble n-butyl-sec-butylmagnesium (in a mixture of benzene and hexane) formed as described above, with solid n-butyl-sodium immediately causes dissolution of the n-butylsodium to produce the desired hydrocarbon-soluble complex. Apparently a 1:1 molar complex is favored since only about one molar equivalent of n-butylsodium is dissolved even in the presence of an excess of this reagent.

The methods described above enable the ready preparation of hydrocarbon solutions of diorganomagnesium complexes of alkali metal alkyls useful in the practice of our invention. Thus, not only binary systems, such as $R_2Mg \cdot RLi$ or $R_2Mg \cdot RNa$, but, also, ternary complexes, such as $R_2Mg \cdot RLi \cdot RNa$ can be produced. Such ternary complexes, in contradistinction to some of the binary systems described above, are not necessarily stoichiometric and many different hydrocarbon-soluble complexes with varying ratios of Mg:Li:Na can be prepared.

The advantages of both the hydrocarbon-soluble binary and ternary organometallic complexes of Groups I and IIa are many. First of all, such complexes allow for the greater ease of handling of normally hydrocarbon-insoluble organomagnesium and organoalkali reagents, such as di-n-propylmagnesium, di-n-butylmagnesium, n-butylsodium, n-amylpotassium and the like. These latter compounds are all highly pyrophoric in the solid state and must be handled in a dry box.

The hydrocarbon solutions of their binary and ternary complexes, on the other hand, can readily be dispensed from glass bottles fitted with rubber septa, by means of hypodermic syringes, without the danger of instant flammability inherent in the solid organometallics. Another advantage to be found in the hydrocarbon solutions of the complexes is their high degree of stability relative to the uncomplexed solid reagents, such as alkylsodium and alkylpotassium reagents. These reagents are known to be highly unstable even at ambient temperatures, decomposing within a few days to unsaturates and alkali hydrides, and often unwanted rearrangements occur.

The Group IIa components of the complexes used in accordance with the present invention exert a moderating effect on the Group I components both in conferring stability on them and in decreasing their reactivity in telomerization reactions. For example, in the latter process, use of an organoalkali reagent alone such as n-butylsodium or n-butylpotassium, as a catalyst, results in its early destruction by competing reactions of metalation of the conventionally accompanying cocatalyst Lewis base and its subsequent cleavage. These competing reactions thus destroy the catalyst and substantially decrease the yield of telomer. On the other hand, complexation of these reagents with diorgano-magnesium reagents stabilizes them toward competing reactions during telomerization and yields of telomers are substantially improved.

As indicated above, in connection with alkali metal alkyls, such as alkyllithiums and alkylsodiums, and the same is true of complexes of alkyllithiums and alkylsodiums, exemplified by n-butyllithium and n-butylsodium, such have been conventionally prepared in ethers, such as diethyl ether and tetrahydrofuran. However, said alkali metal alkyls and their complexes react with ethers, in some cases rather readily, and, therefore, they are relatively unsatisfactory. In sharp contrast, the complexes are formed and, particularly, are used in the presence of major quantities of liquid hydrocarbon solvents, and, therefore, such unwanted side reactions are avoided. The presence of small proportions of Lewis base ethers or aliphatic tertiary amines is not excluded in the practice of our invention although, generally, it is not necessary to employ them.

It is particularly advantageous to utilize, as the Group IIa organometallic compounds of the compositions or complexes or the like which are used in the telomerization method of the present invention, (a) dialkylmagnesiums in which each alkyl contains from three to six carbon atoms, with (b) $C_3$—$C_6$ alkylmetallic compounds in which the metals of said alkylmetallic compounds are Group I metals, namely, one or more from group of lithium, sodium, potassium, rubidium and cesium, especially the n-butylmetallic compounds. However, in one aspect of the broader phases of the invention, the Group I and Group IIa organometallic compounds employed in the production of the compositions or complexes or the like made and utilized in the practice of the present invention can comprise $C_2$–$C_{14}$ hydrocarbon organo radicals, said organo radicals being, for instance, cycloalkyl, cycloalkenyl-alkyl, arylalkyl, arylcycloalkyl, cycloalkylaryl, and the like. Still other types of organo radicals that can be used are those of heterocyclic character, such as 2-pyridyl and 2-thienyl; ethylenically unsaturated organo radicals such as vinyl, allyl and propenyl; polyfunctional organo radicals such as alkylene and polymethylenes as, for example, 1,4-tetramethylene and 1,5-pentamethylene.

Many of the said binary organometallic complexes can be represented by the formula $$x(RM) \cdot y(R^1R^2M^1)$$

where R, $R_1$ and $R_2$ are the same or dissimilar $C_2$–$C_{14}$ hydrocarbon organo radicals; M is a Group I metal, $M^1$ is a Group IIa metal; and $x$ and $y$ are integers reflecting the molar ratios of the respective organometallic compounds comprising the compositions or complexes, the values of $x$ and $y$ and commonly involved being indicated hereafter. Illustrative examples of said hydrocarbon organo radicals, in addition to those previously mentioned, are n-propyl; n-butyl; sec-butyl; n-amyl; tert-amyl; n-octyl; n-undecyl; n-decyl; n-dodecyl; 2-methyl-2-butenyl; cyclopentyl-methyl; cyclohexylethyl; cyclopentyl-ethyl; methylcyclopentyl-ethyl; 4-cyclohexenyl-ethyl; alphanaphthyl-ethyl; cyclopentyl; cyclohexyl; methylcyclopentyl; dimethylcyclopentyl; ethylcyclopentyl; methylcyclohexyl; dimethylcyclohexyl; ethylcyclo-hexyl; isopropyl-cyclohexyl; phenylethyl; phenylcyclohexyl; phenyl; tolyl; xylyl; benzyl; naphthyl; methyl-naphthyl; dimethylnapthyl; ethylnaphthyl; cyclohexylbutyl; 2,7-dimethylocta-2,6-dien-1,8-yl; 2,6-dimethylocta-2,6-dien-1,8-yl; and bis ($\alpha$-2-methylbutyl)-m-xylyl.

Hydrocarbon-soluble complexes are formed by combination of (a) Group I organometallics such as alkyllithium, alkylsodium, alkylpotassium, alkylrubidium and alkylcesium, examples of which are n-butyllithium, sec-butyllithium, n-butylsodium and n-amyl-potassium; aryllithium, arylsodium, arylpotassium compounds, examples of which are phenyllithium, 2-naphthylsodium, and 9-anthryl-potassium; chain extended dialkali metal adducts of conjugated dienes such as the chain extended dilithioadducts and dipotassioadducts of isoprene and of 1,3-butadiene and of 1,3-divinylbenzene (see U.S. Pat. Nos. 3,294,768; 3,388,178 and 3,468,970) some of which adducts can be represented by the formulae $C_{10}H_{14}Li_2$ and $C_{10}H_{14}K_2$; and aralkyllithium, aralkylsodium and aralkylpotassium compounds, examples of which are benzyllithium, diphenylmethyl-sodium and $\alpha$-cumylpotassium, with (b) Group IIa organometallics, such as dialkylmagnesium, dialkylberyllium and dialkylcalcium compounds, examples of which are di-n-butylmagnesium, n-butyl-sec-butylmagnesium, n-amyl-sec-butylmagnesium, di-n-propylberyllium, n-butyl-sec-butyl-beryllium, di-n-butylcalcium and n-amyl-sec-butylcalcium; and arylalkylmagnesium, arylalkylberyllium and aryl-alkylcalcium compounds, examples of which are phenyl-sec-butyl-magnesium, naphthyl-sec-butylberyllium and p-tolyl-sec-amylcalcium; and aralkylalkylmagnesium, beryllium and calcium compounds, examples of which are benzyl-sec-butylmagnesium, p-methylbenzyl-sec-amylberyllium, and diphenylmethyl-sec-butylcalcium, and corresponding compounds where the Group IIa metal is barium or strontium. Ternary complexes may be formed by admixture of any two Group I organo-metallics with one Group IIa organometallic, or vice versa.

Specific illustrative examples of complexes utilized in the practice of our invention are the following, omitting the molar ratios of the Group I and Group IIa organometallics making up said complexes.

1. NN-BuLi·(sec-Bu)₂Ca
2. PhLi·(sec-Bu)₂Mg
3. TolylLi·n-(Am)₂Mg·(sec-Bu)₂Mg
4. sec-BuLi·(sec-Bu)₂Be
5. BenzylLi·(sec-Bu)₂Mg 6. n-BuLi·(sec-Am)$_2$Mg·(sec-Bu)$_2$Ca
7. C$_{10}$H$_{14}$Li$_2$·(sec-Bu)$_2$Mg
8. C$_{10}$H$_{14}$Li$_2$·C$_{10}$H$_{14}$K$_2$·(sec-C$_5$H$_{11}$)$_2$Mg
9. C$_{10}$H$_{14}$Li$_2$·C$_{10}$H$_{14}$K$_2$·$^{(sec-Am)}$(sec-Am)$_2$Mg
10. C$_{10}$H$_{14}$Li$_2$·n-BuLi·(sec-Bu)$_2$Mg
11. (n-C$_5$H$_{11}$) Mg·(sec-C$_4$H$_9$)$_2$Mg·(sec-C$_4$H$_9$Li)
12. (n-C$_4$H$_9$)$_2$Mg·(n-C$_4$H$_9$K)
13. (sec-C$_4$H$_9$)$_2$Mg·(n-C$_4$H$_9$Na)
14. [2(n-C$_5$H$_{11}$)$_2$Mg·(sec-C$_4$H$_9$)$_2$Mg]·(n-C$_4$H$_9$Na)

Molar ratios of the Group I and IIa organometallics in the binary and ternary complexes may be varied over a wide range, but the most practical limits are usually from about 0.1 to 100, and, more desirably, from about 0.5 to 5.

As indicated above, the aforesaid compositions or complexes are employed in the form of solutions thereof in one or more liquid hydrocarbon solvents. Among such solvents are, by way of illustration, aliphatic and cycloaliphatic solvents such as heptane, hexane, octane, isooctane, cyclohexane and methylcyclohexane; but particularly desirable are aromatic hydrocarbons such as benzene, toluene, xylenes, and compatible mixtures of any two or more thereof. It will be understood, of course, that the different complexes will have varying solubilities in different liquid hydrocarbon solvents. However, in general, they will be found to be soluble to a substantial extent in at least most of said liquid hydrocarbon solvents to produce clear solutions.

With regard to the telomerization reactions which are carried out in accordance with the present invention, the telogens which are used are aromatic compounds, especially aromatic hydrocarbon compounds containing at least one hydrogen capable of being replaced by a metal atom but devoid of any other substituents as, for instance, hydroxyl, chlorine, bromine, iodine, carboxyl, and nitro, which substituents are reactive with the catalyst systems fo the present invention. Illustrative examples of such telogens are benzene, C$_1$–C$_4$ mono-, di- and trialkyl benzenes exemplified by toluene, ethylbenzene, n-propylbenzene, isopropylbenzene, o-, m- and p-xylenes; 1,3,5-trimethylbenzene; n-, sec- and tert- butylbenzenes; cyclohexylbenzene; alkyl, notably C$_1$–C$_4$, and cycloalkyl substituted polycyclic aromatic compounds exemplified by 1,2,3,4-tetrahydronaphthalene, 1-methylnaphthalene, 1-isopropylnaphthalene, 1,3-diisobutylnaphthalene; and 1-cyclohexylnaphthalene; alkoxy-aromatic compounds exemplified by anisole; 1,3-dimethoxybenzene; monopropoxybenzene; 1-methoxynaphthalene and 1,3-dimethoxynaphthalene; dialkylamino-aromatic compounds, notably those in which the alkyl is C$_1$–C$_4$, exemplified by dimethylaminobenzene; 1,3-bis-(diisopropylaminobenzene) and 1-dimethylaminonaphthalene. Especially satisfactory is toluene.

The taxogens which are reacted with the telogens to produce telomers in accordance with the present invention are advantageously monomeric conjugated dienes, vinyl-substituted aromatic compounds, and monoolefins, illustrative examples of which have been set forth above, in U.S. Pats. Nos. 3,091,606 and 3,377,404, and of which 1,3-butadiene is especially satisfactory as the monomeric conjugated diene, styrene and α-methylstyrene as the vinyl-substituted aromatic compounds, and ethylene and propylene as the monoolefins.

It has also been discovered, in accordance with the present invention, that the compositions or complexes formed, for instance, from the dialkylmagnesium, such as di-n-butylmagnesium, with alkylpotassiums, such as n-butylpottasium, are especially satisfactory as catalysts for teleomerization of conjugated diene hydrocarbons, notably 1,3-butadiene. The resulting butadiene telomers have an unusually high percentage of unsaturation (commonly in excess of 95 percent) coupled with a relatively low viscosity for the same molecular weight range. Unsaturation is essentially mainly of the vinyl and trans-1,4 types (little or no cis-1,4). Cyclic structures, as depicted above, are generally very low (less than 5 percent), apparently due to the high proportion of trans-1,4-linkages which result from the practice of this aspect of the present invention. Table I shows such relationships, and Table II shows the corresponding properties of such telomers.

TABLE I

MICROSTRUCTURE OF 1,3-BUTADIENE TELOMERS

| Catalyst Type | % Vinyl | % trans-1,4 | % cis-1,4 | % sat'd |
|---|---|---|---|---|
| n-Butyllithium | 68.9 | 7.6 | 0.0 | 23.5 |
| RR'Mg·n-BuNa $^a$ | 76.0 | 13.0 | 7.3 | 3.7 |
| RR'Mg·n-BuK $^b$ | 55.0 | 45.0 | 0.1 | 0.0 |

$^a$R = sec-Bu, R' = n-Amyl; product contained approximately 7 mole % RLi $^b$R = sec-Bu, R' = n-Amyl; product contained approximately 10 mole % RLi

TABLE II

PHYSICAL PROPERTIES AND YIELDS OF 1,3-BUTADIENE TELOMERS

| Catalyst Type | Viscosity Poise (P) | Molecular Weight | Yield (lbs/eq.) |
|---|---|---|---|
| n-Butyllithium $^a$ | 120 P (50°) [2000 P (23°)] | 2130 | 27 |
| RR'Mg·n-BuNa | 744 P (23°) | 1922 | 52.5 |
| RR'Mg·n-BuK | 189 P (26°) | 2220 | 50.0 |

Reaction conditions:
Toluene  400 ml
TMEDA  5 ml
Catalyst  0.034 eq.
Butadiene (gas)  3.5 l/m
Temperature  60-65°C
Time  2-2.5 hrs.

$^a$Dilithioadduct of isoprene, prepared as described in Example 1 of U.S. Pat. No. 3,388,178 gives substantially similar result A particular utility of the hydrocarbon-soluble complexes utilized pursuant to the present invention is their ability to regulate the micro-structure of the telomers during their use as catalysts in telomerization reactions. For example, the use of n-butyllithium in the telomerization of butadiene with toluene, in a manner heretofore suggested by others, results in the production of telomers possessing a high degree of saturated cyclic structures, as depicted below:

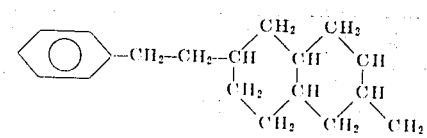

Such cyclic structures detract from the total unsaturation of these polymers and also increase their viscosity. In contrast, the benefits of a higher degree of unsaturation, resulting from the practice of the present invention, are mainly in the greater number of double bonds available for cross-linking in various curing operations, such as are involved in rubber compounding, potting, and metal coating, and in a decreased viscosity which allows for easier handling of the telomeric oils. For example, a low viscosity telomeric oil can be sprayed onto a metal surface to be coated without the aid of a thinner solvent.

In those instances in which Lewis base ethers or aliphatic tertiary amines are utilized in the reaction medium in which the telomers made pursuant to the present invention are produced, illustrative examples of such ethers are linear alkyl ethers such as dimethyl ether, diethyl ether, diisopropyl ether, d-n-butyl ether and diisobutyl ether; dialkyl ethers of aliphatic polyhydric alcohols such as dimethyl ether of ethylene glycol, diethyl ether of ethylene glycol, diisopropyl ether of ethylene glycol and diisopropyl ether of diethylene glycol, and dimethyl-, diethyl- and diisopropyl ethers of propylene glycol, cyclic alkyl ethers such as tetrahydrofuran (THF), tetrahydropyran (THP), dioxane, and 2-oxa [2,2,1]-bicycloheptane (OBH); and liquid ethers in the form of azaoxa-alkanes, azaalkyloxacycloalkanes or oxa-alkylazacycloalkanes which can be represented by the formulae:

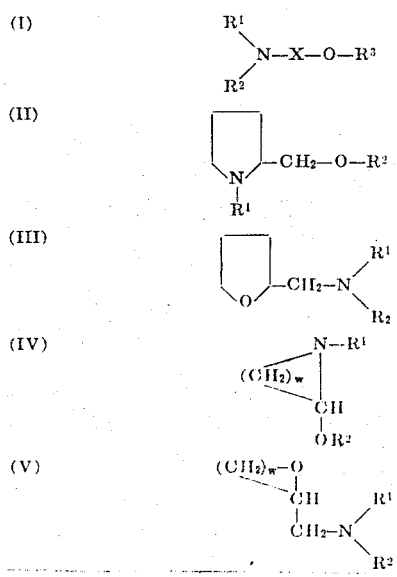

where $R^1$, $R^2$ and $R^3$ are the same or different alkyls each containing from one to four carbon atoms, namely, methyl, ethyl, n-propyl, isopropyl, n-butyl, isobutyl and tert-butyl; X is a non-reactive group such as —CH$_2$—CH$_2$—, —CH$_2$—CH$_2$—CH$_2$—,

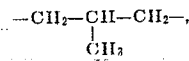

or other divalent aliphatic hydrocarbon or alkylene radicals, preferably containing from two to four carbon atoms; and $w$ is one to four. Illustrative examples of such ethers include, for instance, 2-dimethylamino-ethylmethyl ether [(CH$_3$)$_2$—N—CH$_2$—CH$_2$—O—CH$_3$]; 2-diethylaminoethyl-methyl ether [(C$_2$H$_5$)$_2$—N—CH$_2$—CH$_2$O—CH$_3$]; and 2-dimethylaminopropyl-methyl ether [(CH$_3$)$_2$—N—CH$_2$—CH$_2$—CH$_2$—O—CH$_3$]. An illustrative dioxacycloalkane is 2,2′di (tetrahydrofuranyl)

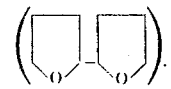

The Lewis base aliphatic tertiary amines include, by way of illustration, trimethylamine, triisopropylamine and tri-butylamine; and ditertiary amines such as N,N,-N′,N′-tetramethyl-ethylenediamine. Other suitable Lewis base tertiary amines which can be utilized are disclosed in U.S. Pat. No. 3, 206,519 and British Patent No. 1,051,269 which, for this showing, are herewith incorporated by reference. Especially suitable, where such cocatalyst is used, are N,N,N′,N′-tetramethylethylenediamine (TMEDA) and 1-Dimethylamine-2-ethoxyethane(2-dimethylaminoethyl ethyl ether).

The nature of the catalyst compositions utilized in accordance with the present invention strongly affects the molecular weight of the telomers produced. Thus, depending on the electro-negative nature of E in the complex RMgE·RK, a high or low molecular weight may be obtained. This is presumably due to the ability of the catalyst component RMgE to compete favorably for RK in the presence of at least one molar equivalent of the Lewis base, e.g. TMEDA. The greater the electronegativity of E, the less tightly is RMgE bound to RK. Thus, in the following equations, $k_1 > k_2 >>> k_3$.

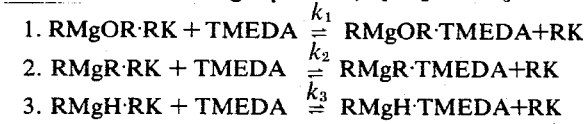

Thus, catalyst system (1), which consists mainly of free RK, produces low molecular weight telomers (ca 500 or less), while, on the other hand, catalyst system (3) which consists mainly of RMgH·RK, produces high molecular weight telomers (ca 5000 or higher).

The following examples are illustrative of the production of compositions or complexes and their use in telomerization reactions, all in accordance with the present invention. It will be understood that other compositions or complexes can be made and other telomerizations carried out in the light of the guiding principles and teachings disclosed herein. All temperatures are in degrees C.

EXAMPLE I

Preparation of Di-n-Amylmagnesium-Di-sec-Butylmagnesium

This example shows the preparation of di-n-amylmagnesium-di-sec-butylmagnesium which can then be complexed with alkali metal alkyls (as note, for instance, in Example IV).

13.4 g of -200 mesh magnesium powder was placed in a 1-liter 3-necked flask, and covered with 50 ml of dried methylcyclohexane. Then 2 ml of a 1.0 N solution containing a complex of 1.2 equivalents of di-n-amylmagnesium and 0.8 equivalents of di-sec-butylmagnesium in hexane-cyclohexane was added to the mixture as well as 10 ml of a solution of 53.8 g (0.5 moles) of n-amyl chloride in 200 ml of methylcyclohexane. Heating and stirring was begun. At 75°, reaction commenced, as observed by a rapid rise in temperature to 88° and notable thickening of the mixture. After the reaction subsided, the remainder of the halide solution was added over a 3.5 hour period. The heating was maintained to keep the temperature of the reaction mixture at about 80° (± 5°). Vigorous stirring was maintained throughout the addition. 50 ml of solvent was then added to the mixture and heating at 80° and vigorous stirring continued for two hours. The mixture was allowed to cool to 60° and 30 ml of 1.2 N sec-butyllithium (s-BuLi) in hexane added. Immediate thinning of the mixture was noted. An additional 60 ml of said 1.2 N s-BuLi solution was added, the mixture then thinning out to the consistency of the solvent. The mixture was stirred for one hour and allowed to settle. The total alkalinity concentration of the clear supernatant solution was 1.09 N. An additional 75 ml of the 1.2 N s-BuLi solution was added and the mixture stirred for 30 minutes. The mixture was then filtered to give a clear, colorless solution. The solids were washed with 100 ml of hexane to give a total of 530 ml of a 0.99 N solution (525 meq of base). Subtracting a total of 165 × 1.2 N = 198 meq of s-BuLi, and adding 22 meq for analytical samples, there is obtained a residual of 348 meq of base corresponding to a 70 percent recovered yield of di-n-amylmagnesium (based on starting n-AmCl). The GLC ratio of 1.75 n-amyl to 1 sec-butyl groups in the product was determined by oxidizing a 10 ml sample with dry air, hydrolyzing and acidifying the mixture and analyzing the supernatant solution on a Carbowax 400 column at 110°C. (No correction factor was applied). The product solution was further analyzed for Mg by EDTA titration and active alkyl content by titration with a standard solution of sec-butyl alcohol in toluene (1,10-phenanthroline was the indicator).

Found: Mg = 1.02 N, A.A. = 0.95 N (T.B. = 0.99).

EXAMPLE II

Di-n-Butylmagnesium-n-Butyllithium Complex

To a mixture of $(n-C_4H_9)_2Mg$ and $MgCl_2$, in an inert atmosphere, prepared from $n-C_4H_9Cl$ and activated Mg metal, concentrated n-BuLi (95 percent in hexane), 1 ml at a time, was added until base appeared in solution. At this point, all of the activated $MgCl_2$ had been reacted. Then a calculated amount of concentrated n-$C_4H_9Li$ was added to make the catalyst. When the Mg:Li ratio reached 2:1, all of the di-n-butylmagnesium had dissolved. Further addition of lithium led to an increase in the lithium content of the solution. By this means, various ratios can be made.

EXAMPLE III

Di-n-Butylmagnesium-Di-sec-Butylmagnesium Complexed with n-Butylsodium 1 g of n-butylsodium (0.0125 moles) was shaken with a mixture of 10 ml of a 1.48 N solution (0.0074 moles) of a complex of n-butylmagnesium and sec-butylmagnesium (weight ratio of said n-butylmagnesium to said sec-butylmagnesium is 2:1) in n-hexane and 6 ml of benzene. The mixture was allowed to stand for about one-half hour. If the resulting solution is not clear, such solid as may be present can be removed by centrifugation. The clear supernatant or solution, on analysis for sodium and magnesium, showed that the same contained the butylsodium and the butylmagnesiums in a mole ratio of approximately 1:1 (Found: Na: 0.44 mmoles/ml; Mg: 0.42 moles/ml). The apparent complex may be represented by the formula $n-C_4H_9Na \cdot C_4H_9)_2Mg$.

EXAMPLE IV

Di-n-Amylmagnesium-Di-sec-Butylmagnesium Complexed with n-Butylsodium and n-Butyllithium To 9.6 g (0.1 mole) of sodium tert-butoxide suspended in 50 ml of hexane was slowly added, with stirring, a volume of 129 ml of a 2.33 N (0.3 moles) solution of n-butyllithium in n-hexane with external cooling (−10°). After allowing the contents to come to room temperature, the white n-butylsodium was filtered off and washed with 50 ml of hexane. To the residual solid product after washing was added 100 ml of a 1 N solution of the complex dialkyl-magnesium compound of Example 1, prepared by mixing one equivalent of di-sec-butylmagnesium in hexane with two equivalents of di-n-amylmagnesium in methylcyclohexane (the complex can be indicated as $[(n-Am)_2Mg]_2 \cdot (sec-Bu)_2Mg$. As the solid n-butylsodium dissolved in the dialkylmagnesium solution, a sticky, highly pyrophoric, liquid second phase separated out. The addition of 20 ml of benzene dissolved this second phase to give, on filtration, 125 ml of completely clear solution containing approximately equimolar quantities of the sodium and magnesium alkyls.

Found: 0.35 mmoles/ml of Mg; 0.31 mmoles/ml of Na. The solution also contained 0.048 mmoles/ml of Li.

EXAMPLE V

Di-n-Butylmagnesium-Di-sec-Butylmagnesium Complex with n-Butyllithium and n-Butylsodium To 1.663 g (0.02 moles) of n-butylsodium, as a solid white powder, was added 23 ml of a 1.8 M solution of n-butyllithium in benzene and the mixture stirred thoroughly. To 5 ml of this mixture was added 5 ml of a 0.95 molar solution of mixed dialkyl-magnesiums (in a weight ratio of 2 parts of di-n-butylmagnesium to 1 part of di-sec-butylmagnesium) in hexane. Heat was generated and most of the solids dissolved, yielding a slightly hazy, light orange solution. Centrifugation yielded a perfectly clear solution. Analysis of the solution for Na, Li and Mg gave the following results:

Calculated: Na — 1.75 mmoles; Li — 4.50 mmoles; Mg — 2.50 mmoles.

Found: Na — 1.34 mmoles; Li — 4.34 mmoles; Mg — 2.74 mmoles.

The ternary complex (containing approximately 3Li:2Mg:1Na) produced a solution of 2.26 Normal in total alkalinity, which was stable at ambient and refrigerated temperatures.

To demonstrate the non-stoichiometry of these complexes, another combination of the three butylmetallics was made as described above, yielding, ultimately a clear, stable, 2.41 N benzene solution containing a molar ratio of 1.67 Mg:1.67Li:1Na.

EXAMPLE VI

Di-n-Amylmagnesium-Di-sec-Butylmagnesium Complexed with n-Butyllithium and n-Butylpotassium To a slurry of 11.2 g (0.1 mole) of potassium tert-butoxide in 50 ml of cyclohexane was added slowly, with stirring and ice-bath cooling, 150 ml of a 2.5 N n-butyllithium solution in hexane. (3.3 molar equivalents). The temperature during reaction did not rise above 25°. The resultant mixture was filtered and the solids washed with n-pentane. The white solids appeared to be somewhat unstable, darkening to a light brown color after several days storage in the Dry Box at room temperature. The filtrate components were also unstable, a red-brown solid precipitating out slowly. Both solids and filtrate were analyzed for K and Li.

Found in filtrate (total): Li – 244 meq; K – 19 meq.
Found in solid (1–1.5 g sample): Li – 11 meq; K – 6.1 meq.

To the remainder of the solid (approximately 2:1 BuLi-BuK complex) was added 190 ml of a 1.07 N solution of a complex formed by admixing 1.5 equivalents of di-n-amylmagnesium in cyclohexane and 1 equivalent of di-sec-butylmagnesium in hexane. 50 ml of cyclohexane was added; the mixture shaken thoroughly and a 40 ml aliquot was transferred to a centrifuge tube. After spinning the mixture down, a 10 ml aliquot of the supernatant was analyzed for Li, K and Mg.
Found:
Li — 0.28 mmoles/ml; K — 0.06 mmoles/ml;
Mg — 0.21 mmoles/ml.

To the remaining mixture in the centrifuge tube was added 10 ml of benzene. Most of the remaining solid dissolved. Further addition of 5 ml benzene did not result in any further solubilization of the solids. After spinning the mixture down, a 10 ml aliquot of the clear supernatant solution was analyzed for K, Li and Mg.
Found:
Li – 0.21 mmoles/ml; K – 0.12 mmoles/ml;
Mg – 0.26 mmoles/ml.

Mg had been dissolved from the solids by addition of benzene. Most of the remaining hexane-cyclohexane slurry of the ternary alkylmetallic salt mixture was transferred to centrifuge tubes and spun down. The supernatant was discarded and the solids washed twice with 25 ml portions of hexane. Then, 25 ml of benzene was added to each of the tubes and the mixture shaken thoroughly. Most of the solids dissolved. The tubes were centrifuged and the yellow clear supernatant solution analyzed for Li, K and Mg.
Found:
Li – 0.072 mmoles/ml; K – 0.269 mmoles/ml;
Mg – 0.353 mmoles/ml.

EXAMPLE VII

Di-n-Butylmagnesium-Di-sec-Butylmagnesium Complexed with n-Butylsodium

To 13 ml of a 1.23 N solution of a complex formed from 2 equivalents of di-sec-butylmagnesium in hexane and 1 equivalent of di-n-butylmagnesium in cyclohexane were added 8 ml of benzene and 1 to 2 g of n-butylsodium (excess). The mixture was shaken well, spun down in the centrifuge, and the clear supernatant analyzed for Mg and Na.
Found:
0.48 mmoles/ml Na; 0.39 mmoles/ml Mg (average of two results)

EXAMPLE VIII

Di-n-Butylmagnesium-Di-sec-Butylmagnesium Complexed with n-Butulpotassium a. To approximately 1 g (0.01 mole) of potassium tert-butoxide suspended in 10 ml of benzene in a centrifuge tube was added 25 ml of a 1.22 N solution of a complex made up of 2 equivalents of di-n-butylmagnesium in cyclohexane and 1 equivalent of di-sec-butylmagnesium in hexane. The resulting suspension was spun down and the clear solution and solid analyzed for K and Mg.
Found in solution: K – 5.0 meq; Mg – 26.8 meg.
Found in solid: K – 3.5 meq; Mg – 2.8 meq.

EXAMPLE IX

Complex of Chain-Extended Dilithioisoprene with Di-n-Butylmagnesium

Magnesium metal powder (6 g, 0.25 g atoms) was reacted with neat n-butyl chloride (23 g, 0.5 moles) in an inert atmosphere. When the reaction mixture became viscous, 100 ml of benzene was added slowly to thin it out. When the reaction was complete, the reaction mixture was cooled and concentrated n-BuLi was added in 1–2 increments until a small amount of basic material remained in solution. Then a sufficient amount of a partial suspension in benzene of chain-extended dilithioisoprene was added to produce a solution with a 3:1 Li:Mg ratio. A clear red solution resulted.

EXAMPLE X

Complex of Chain-Extended Dilithioisoprene and Dimagnesioisoprene with Di-n-Butylmagnesium Magnesium metal powder (6 g, 0.25 g atoms) was reacted with neat n-butyl chloride (23 g, 0.5 mole) in an inert atmosphere. When the reaction mixture became viscous, 100 ml of benzene was added slowly to thin it out. When the reaction was complete, the mixture was cooled and a cloudy solution of chain-extended dilithioisoprene in benzene was added slowly. Some heat was evolved. The reaction mixture was allowed to settle and the resultant mixture was filtered. The solution was thinned out in order for the filtration to proceed at an acceptable rate. A slightly cloudy red solution resulted.

EXAMPLE XI

Complex of Butyl (n- and sec-) Potassium and Dibutyl (n- and sec-) Magnesium

This Example shows the production of a binary hydrocarbon-soluble complex of a Group I alkylmetallic and a Group IIa alkylmetallic by treatment of a soluble dialkylmagnesium complex produced above with at least one molar equivalent of an alkali metal, preferably very finely dispersed in a hydrocarbon solvent and filtering the resulting solution of the said product complex of the Group I alkylmetallic and the Group IIa dialkylmetallic.

To a dispersion of 3.1 g of potassium metal in 100 ml of heptane was added 240 ml of a 0.81 N solution of a 1:1 complex of di-n-butylmagnesium and di-sec-butylmagnesium in hexane-cyclohexane $(1:1)_x$ and the mixture stirred at ambient temperature for 16 hours. The product was allowed to settle out, the supernatant solution was drawn off, and the residue treated with 350 ml of benzene. Magnesium metal and unreacted potassium metal were filtered away to give a clear solution of the 1:1 complex of butyl (n- and sec-) potassium and dibutyl (n- and sec-) magnesium in benzene. Analysis for Mg and K showed the concentration of the former to be 0.185 molar, while the concentration of the latter was found to be 0.166 molar.

EXAMPLE XII

Telomerization of 1,3-Butadiene with Toluene

To 400 ml of toluene was added 5 ml of TMEDA and 32 ml of the catalyst solution of EXAMPLE IV (catalyst concentration = 0.08 N). Then, 1,3-butadiene was added as a gas at a flow rate of 3.5 liters/minute. The temperature rose immediately from 25° to 60° and was maintained at 60°–65° throughout the reaction, with external cooling. After 1.5 hours, the catalyst ceased to function (no further absorption of butadiene) and 2 ml of $H_2O$ was added. The telomeric product was stripped of toluene under vacuum. The product, a pale yellow, viscous liquid (744 poise at 23°, 33 poise at 1922, ) with a molecular weight (VPO) of 1922, weighed 798 g, representing a yield of 52.5 lbs per equivalent of catalyst. The microstructure of the resulting polybutadiene was determined by infra-red analysis to be as follows:

Vinyl – 76.0 percent, cis-1,4 – 7.3 percent, trans-1,4 – 13.0 percent, saturated (cyclic) – 3.7 percent.

EXAMPLE XIII

Telomerization of 1,3-Butadiene with Toluene

A. To 400 ml of toluene was added 0.034 equivalents of the catalyst of Example VI and 5 ml of TMEDA (catalyst concentration = 0.08 N). Then 1,3-butadiene was added as a gas at a flow rate of 3.5 liters/minute. The temperature rose immediately from 25°–60° and was maintained at 60°–65° throughout the reaction with external cooling. After three hours, 2 ml of $H_2O$ were added. The telomeric product was stripped of toluene under reduced pressure. The product, a pale yellow, free-flowing (189 poise at 26°) liquid with a molecular weight (VPO) of 2220, weighed 765 g (representing a yield of 50 lbs per equivalent of catalyst). The microstructure of the resulting polybutadiene was determined by infra-red analysis to be as follows:

| | |
|---|---|
| % vinyl | 55.0 |
| % trans-1,4 | 45.0 |
| % cis-1,4 | 0.1 |
| % saturated structures | None |

B. By comparison with the above results, the following telomeric product was obtained using n-butyllithium alone.

To 400 ml of toluene was added 3 ml (0.034 moles) of concentrated n-butyllithium and 5 ml of 1-dimethylamino-2-ethoxy-ethane (TMEDA yields similar results). Then, 1,3-butadiene was added as a gas at a flow rate of 5 liters/min. The temperature was raised to 65° and maintained at 60°–65° with external cooling. After 2 hours, 2 ml of n-butanol was added. The telomeric product was stripped of toluene under reduced pressure. The product, a yellow viscous oil with a molecular weight (VPO) 2130 weighed 410 g (representing a yield of 27 lbs per equivalent of catalyst). The microstructure of the resulting polybutadiene was determined by infra-red analysis to be as follows:

| | |
|---|---|
| % vinyl | 68.9 |
| % trans-1,4 | 7.6 |
| % saturated (cyclic) | 23.5 |
| % cis-1,4 | None |

EXAMPLE XIV

Telomerization of 1,3Butadiene with Toluene using a 1:1 Catalyst Complex Composed of n-Butyl-tert-Butoxymagnesium and n-Butylpotassium To 400 ml of toluene was added 2.35 g (0.017 moles) of solid di-n-butylmagnesium and 1.9 g (0.017 moles) of potassium tert-butoxide. The mixture was stirred for 5 minutes to give a yellow, soluble catalyst complex, $(n-C_4H_9K) \cdot (n-C_4H_9MgO\text{-tert-}C_4H_9)$. A volume of 2.5 ml (0.017 moles) of N,N,N',N'-tetramethylethylenediamine (TMEDA) was added and 1,3 butadiene was then added as a gas at 3.4 liters per minute. The solution became a very deep red. The reaction temperature was kept at 60°–65°. After 1 hour the reaction mixture ceased to take up the 1,3-butadiene. The mixture was then hydrolyzed with 2 ml of water and the excess toluene was removed under vacuum to yield 800 g of a dark yellow, mobile oil (viscosity = 7.25 poise (24°)) with a molecular weight of 435. The yield of telomeric product was 23.5 kg per equivalent of catalyst.

EXAMPLE XV

Telomerization of 1,3-Butadiene wth Toluene using a 1:1 Catalyst Complex Composed of D-sec-Butylmagnesium and sec-Butylpotassium The procedure of Example XII was used essentially unchanged except that the catalyst system was a complex composed of 1 molar equivalent of di-sec-butylmagnesium and 1 molar equivalent of sec-butylpotassium, prepared by the reduction of di-sec-butylmagnesium with dispersed potassium metal in a mixture of hexane and heptane. The yield of telomeric product was 25 kg per equivalent of catalyst.

What is claimed is:

1. In a method of preparing telomers in which the telomers are prepared, in the presence of a catalyst, by a reaction between a telogen in the form of an aromatic compound containing at least one active hydrogen capable of being replaced by a metal atom but devoid of any other substituents which are reactive with the organometallic compounds defined hereafter, with at least one taxogen in the form of a monomer selected from the group consisting of conjugated dienes, vinyl-substituted aromatic compounds, and monoolefins, the improvement which consists in the utilization, as the catalyst, in a hydrocarbon solvent solution, of a complex of (i) at least one organometallic compound in which the metal is a Group IIa metal, with (ii) at least one organometallic compound in which the metal is a Group I metal, the organo radicals of said (i) and (ii) organometallic compounds being $C_2$–$C_{14}$ hydrocarbon radicals selected from the group of alkyl, cycloalkyl, aryl, alkylaryl, cycloalkylaryl, heterocyclic, ethylenically unsaturated organo radicals, alkylene, and polyenes.

2. The method of claim 1, in which the hydrocarbon solvent is at least one member of the group of pentane, hexane, heptane, octanes, cyclohexane, cyclooctane, benzene and toluene.

3. The method of claim 1, in which telomers are prepared and in which the telogen is toluene and the taxogen is 1,3-butadiene.

4. The method of claim 2, in which the (i) organometallic compound is a dialkylmagnesium in which each alkyl contains from three to six carbon atoms.

5. The method of claim 4, in which the dialkylmagnesium is selected from the group of di-n-butylmagnesium and di-sec-butylmagnesium.

6. The method of claim 2, in which the (ii) organometallic compound is an alkyl alkali metal compound in which the alkyl contains from three to six carbon atoms.

7. The method of claim 6, in which the alkyl alkali metal compound is selected from the group of n-butyllithium, n-butylsodium and n-butylpotassium.

8. The method of claim 3, in which the catalyst is a complex of dibutylmagnesium with n-butyllithium or n-butylpotassium.

9. The method of claim 1, in which the (ii) organometallic compound is a polylithioadduct of a conjugated diene selected from the group of isoprene or 1,3-butadiene.

10. In a method of preparing telomers in which the telomers are prepared, in the presence of a catalyst, by a reaction between (a') a telogen in the form of an aromatic compound containing at least one active hydrogen capable of being replaced by a metal atom but devoid of any other substituents which are reactive with the organometallic compounds defined hereafter, with (a'') at least one taxogen in the form of a monomer selected from the group consisting of conjugated dienes, vinyl-substituted aromatic compounds, and monoolefins, the improvement which consists in the utilization, as the catalyst, of a complex of at least one dialkylmagnesium containing from two to 14 carbon atoms with at least one alkylmetallic compound in which the metal of said alkylmetallic compound is selected from the group of lithium, sodium, and potassium.

11. The method of claim 10, in which the telogen is toluene and the taxogen is 1,3-butadiene.

12. The method of claim 10, in which the catalyst complex is employed in the form of a solid.

* * * * *